United States Patent
Sun et al.

(10) Patent No.: US 9,226,149 B2
(45) Date of Patent: Dec. 29, 2015

(54) SYSTEM AND METHOD FOR RAPID AUTHENTICATION IN WIRELESS COMMUNICATIONS

(75) Inventors: Sheng Sun, Kanata (CA); Yunbo Li, Shenzhen (CN); Kwok Shum Au, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 13/450,215

(22) Filed: Apr. 18, 2012

(65) Prior Publication Data
US 2013/0283346 A1    Oct. 24, 2013

(51) Int. Cl.
*H04W 76/02*    (2009.01)
*H04W 12/06*    (2009.01)

(52) U.S. Cl.
CPC .................................... *H04W 12/06* (2013.01)

(58) Field of Classification Search
CPC ......... H04W 12/00; H04W 12/06; H04L 9/00
USPC ................................................. 455/410, 411
See application file for complete search history.

(56) References Cited

U.S. PATENT DOCUMENTS

| | | | | |
|---|---|---|---|---|
| 8,175,015 | B1* | 5/2012 | Chowdhuri et al. | 370/300 |
| 8,578,159 | B2* | 11/2013 | Emeott et al. | 713/168 |
| 2007/0192832 | A1* | 8/2007 | Qi et al. | 726/3 |
| 2009/0175447 | A1* | 7/2009 | Adachi et al. | 380/270 |
| 2009/0217033 | A1* | 8/2009 | Costa et al. | 713/155 |
| 2013/0176897 | A1* | 7/2013 | Wang et al. | 370/254 |
| 2013/0263223 | A1* | 10/2013 | Cherian et al. | 726/4 |

OTHER PUBLICATIONS

IEEE Standard for Information technology—Telecommunications and Information exchange between systems—Local and metropolitan area netwoks—Specific requirements, Part 11: Wireless LAN Medium Access Control (MAC) and Physical Layer (PHY) Specifications, IEEE Std 802.11$^{tm}$-2007, Jun. 12, 2007, 1,232 pages.

* cited by examiner

*Primary Examiner* — Andrew Nalven
*Assistant Examiner* — Mary Li
(74) *Attorney, Agent, or Firm* — Slater & Matsil, LLP

(57) ABSTRACT

Various methods and communications devices to improve association and handoff performance of a wireless network are provided. By way of example, a modified state machine that permits reduced security requirements for authentication in order to achieve fast authentication is employed. The modified state machine providing fast authentication remains compatible with the classic state machine implementing the wireless fidelity (WiFi) standard.

19 Claims, 5 Drawing Sheets

SYSTEM AND METHOD FOR RAPID AUTHENTICATION IN WIRELESS COMMUNICATIONS

TECHNICAL FIELD

The present disclosure relates generally to wireless communications, and more particularly to facilitating rapid authentication in wireless communications.

BACKGROUND

Computer systems located within a specific local geographic region (e.g., an office, building floor, building, home, or any other defined indoor and/or outdoor geographic region) are typically interconnected using a Local Area Network (LAN) (e.g., the Ethernet). The LANs, in turn, can be interconnected with each other using a Wide Area Network (WAN) (e.g., the Internet). A conventional LAN can be deployed using an Ethernet-based infrastructure comprising cables, hubs switches, and other elements. Connection ports (e.g., Ethernet ports) can be used to couple multiple computer systems to the LAN. For example, a user can connect to the LAN by physically attaching a computing device (e.g., a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed and/or provided by these computers (e.g., file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations.

The IEEE 802.11 family of standards, which are known as Wireless Local Area Network, WLAN or WiFi, are popular for such wireless communication. One recent standard for wireless communication is 802.11ai, which employs a security state machine to facilitate authentications and associations.

SUMMARY OF THE DISCLOSURE

Technical advantages are generally achieved by embodiments of the present disclosure which provide a system and method for content and application acceleration in a wireless communications system.

In an embodiment, a method for transmitting data including transmitting a medium access control frame for fast initial link set up (FILS) authentication, participating in a FILS authentication procedure with a client, and transmitting a response to the client indicating whether FILS authentication was successful.

In an embodiment, a method for transmitting data including receiving a medium access control frame with fast initial link set up (FILS) information, participating in a FILS authentication procedure with an access point (AP), and receiving a response from the AP indicating whether FILS authentication was successful.

In an embodiment, a communications device including a receiver configured to receive packets, a transmitter configured to transmit packets, and a state machine module coupled to the receiver and to the transmitter. The state machine module is configured to participate in a fast initial link set up (FILS) authentication procedure with a client to authenticate the client.

In an embodiment, a communications device including a receiver configured to receive packets, a transmitter configured to transmit packets, and an authentication/association module coupled to the receiver and to the transmitter. The authentication/association module is configured to participate in a fast initial link set up (FILS) authentication procedure and a FILS association procedure with an access point (AP) to obtain authentication and association from the AP.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to a specific context, namely a wireless communications system that supports communications devices with data capability, i.e., third-generation (3G) and fourth-generation (4G) communications devices. The concepts of the present disclosure may also be applied, however, to wireless communications systems that support data capable communications devices in general.

Figure 1:
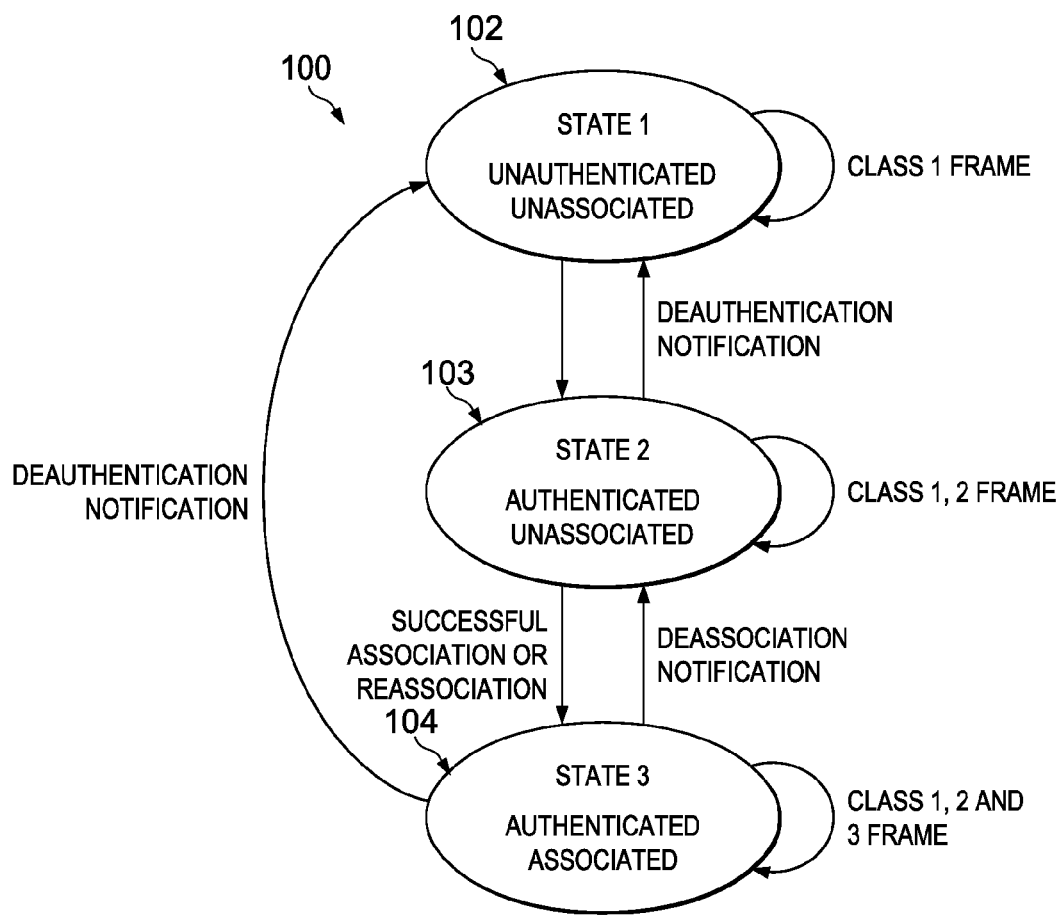
FIG. 1 is a simplified schematic of a security state machine of the IEEE 802.11 standard.

FIG. 1 illustrates a high-level view of the security state machine 100 of the IEEE 802.11 standard. A brief overview of the state machine 100 will be provided. As shown, the state machine 100 may be in one of three states, namely unauthenticated/unassociated 102 (State 1), authenticated/unassociated 103 (State 2), and authenticated/associated 104 (State 3). In the initial State 1, a client (or station) is completely disconnected from, for example, the WLAN. The client cannot pass any data frames (or packets) through access points (or APs) to other clients on the WLAN or the wired infrastructure. Rather, the client can only accept or exchange certain control frames (e.g., clear to send (CTS), acknowledgement (ACK), CF-End, CF-END+CF-Act) and certain management frames (e.g., probe response, beacon, authentication, deauthentication, and announcement traffic indication message (ATM)).

The second state, or State 2, is employed to authenticate an unassociated state. To move from State 1 to State 2, the client must perform some type of valid authentication. This can be accomplished with, for example, authentication frames. Once State 2 is reached, the client can issue association request frames to be processed by the AP. Indeed, once State 2 is reached, the client can accept or exchange certain management frames (e.g., association request/response, reassociation request/response, and disassociation). However, other IEEE 802.11 frame types are not permitted.

The third state, or State 3, is the authenticated and associated state. Once State 3 is reached, the client can accept or exchange certain control frames (e.g., PS-Poll), certain management frames (e.g., deauthentication), and any data frames. In order for the client to be in this state, the client must have been authenticated and then associated. The process of moving from State 2 to State 3 is generally a four frame transaction. The client first sends an association request frame to the AP to which it has been authenticated. The AP responds with an acknowledgement frame (ACK). Next, the AP sends an association response frame either allowing or disallowing the association. The client sends an ACK frame as the fourth and final step. If the client has achieved State 3, the client may communicate on the WLAN or through to the wired network assuming encryption keys match.

Figure 2:
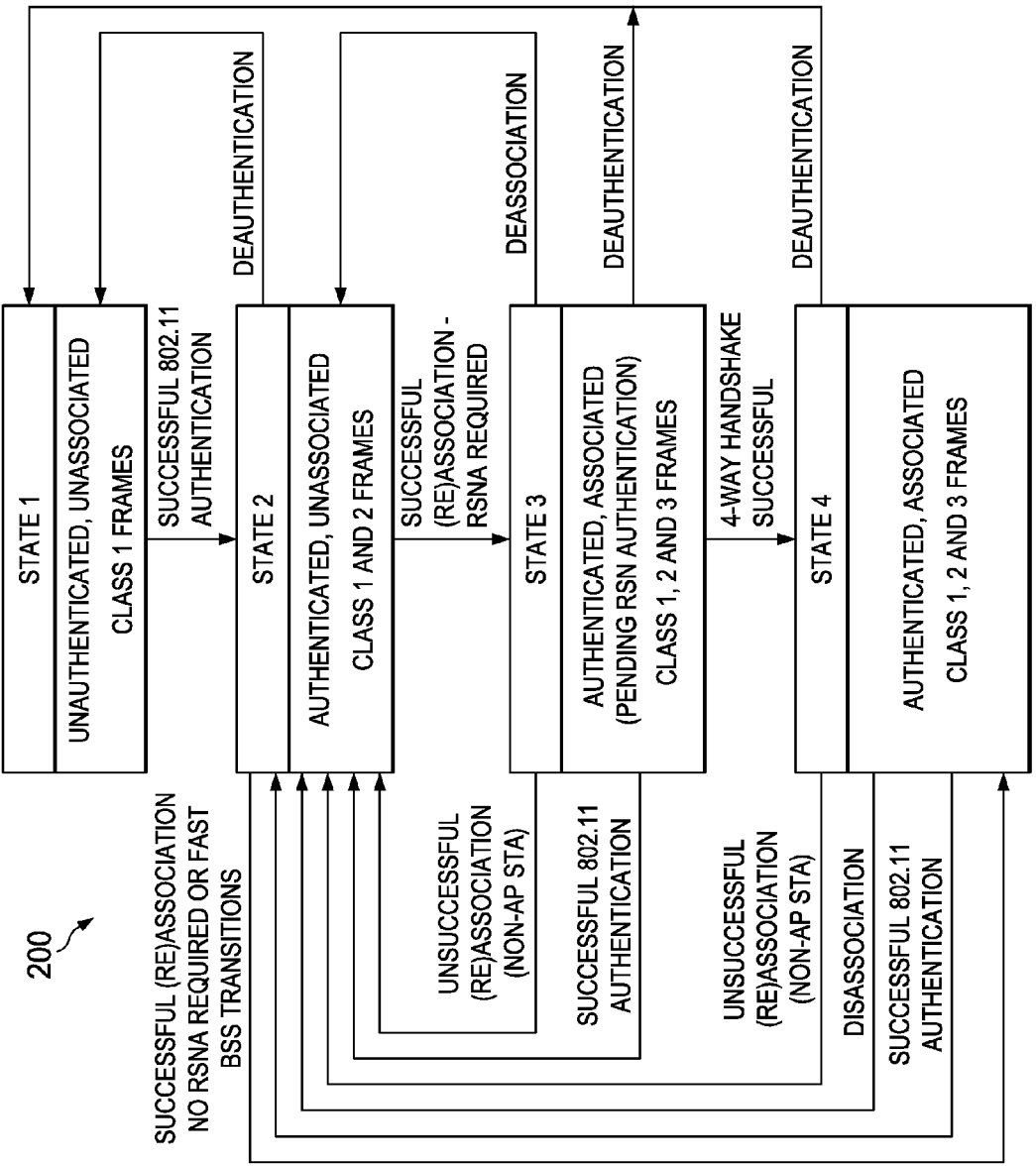
FIG. 2 is a simplified schematic of another security state machine of the IEEE 802.11 standard.
Figure 3:
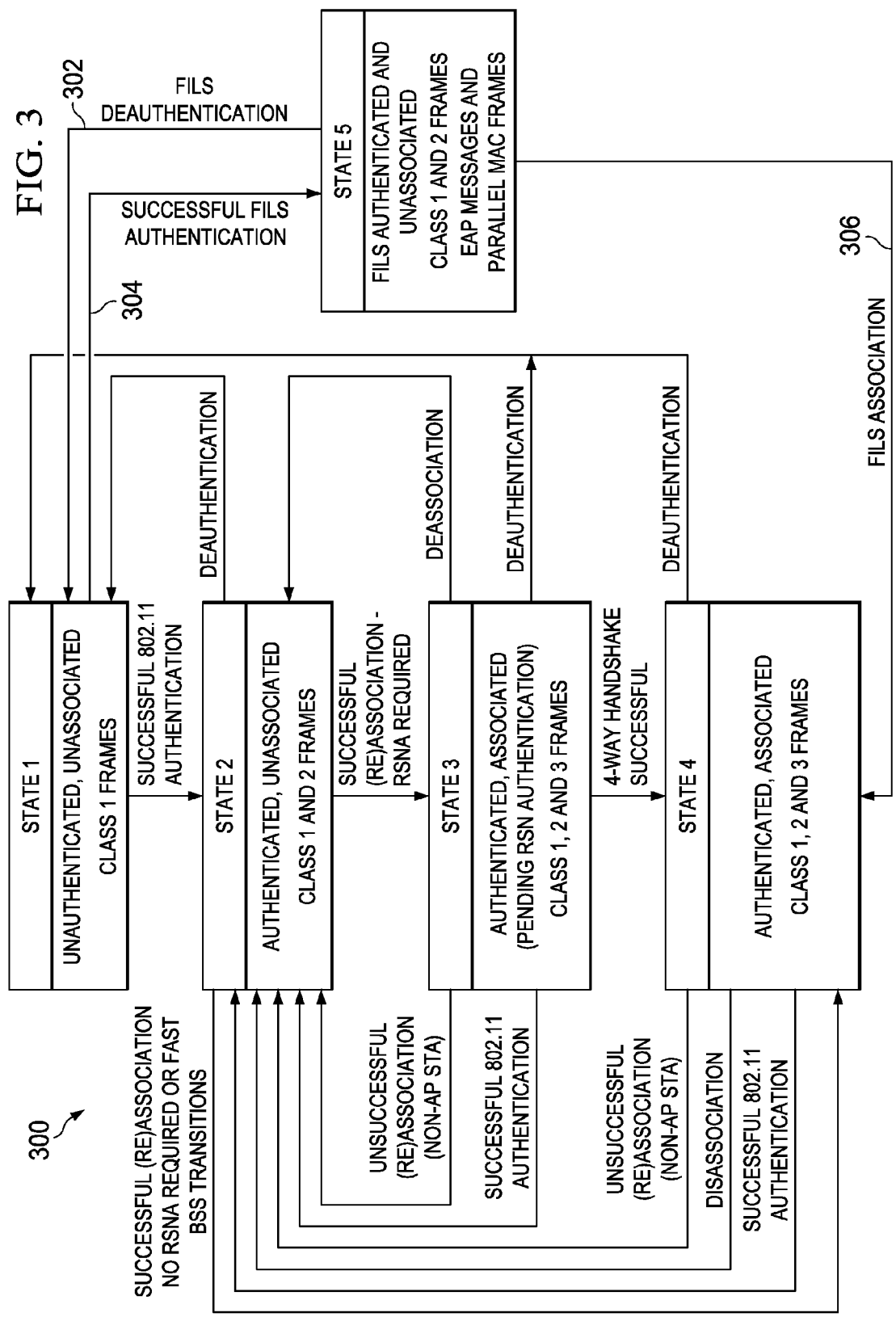
FIG. 3 is an embodiment of a simplified schematic of an IEEE 802.11 state machine security state machine.

Unfortunately, the state machines 100, 200 illustrated in FIGS. 1-2 may be unable to meet the association of newer WiFi standards such as, for example, 802.11ai. To remedy these and other deficiencies, the IEEE 802.11 security state machine 300 depicted in FIG. 3 is implemented. As will be more fully explained below, the state machine 300 permits, for example, some extensible authentication protocol (EAP) messages and some other parallel MAC frames to pass through the AP.

Still referring to FIG. 3, if both the client and the AP agree on implementing the fast initial link setup (FILS) mode, then initiation of procedures to achieve State 5 as shown in FIG. 3 may be employed. In that regard, the AP may transmit an 802.11 medium access control (MAC) frame (e.g., a beacon) message containing a robust security network (RSN) information element (IE) with FILS authentication information. Upon encountering the medium access control frame message, the client initiates a FILS authentication request and response protocol where the client requests FILS authentication and the AP responds with the RSN IE with FILS authentication information. If FILS authentication is unsuccessful due to, for example, an elapsed timer, FILS Deauthentication 302 occurs and the client remains at State 1. If, however, a Successful FILS authentication 304 is achieved the client is permitted to transition to State 5. In an embodiment, at State 5 the FAST Security Association (FSA) key materials for both the client and the AP will be maintained.

In State 5, which enables the FILS authentication and association, certain MAC frames are allowed to be transmitted across the AP. For example, in State 5 the Class 1 and Class 2 medium access control (MAC) service data units (MSDU) in the 802.11 authentication frame carrying FILS authentication and other selected data frames (e.g., Class 3 frames) inside Upper Layer Information Elements (ULIE), which will be re-assembled at the AP and forwarded to the network, can be transmitted across the AP. Here, the network represents the system architecture behind the AP whereby Authentication, Authorization and Auditing (AAA), dynamic host configuration protocol (DHCP), domain name system (DNS) procedures, and routing will take place as indicated in the IEEE 802.11 standard.

In an embodiment, certain allowed management frames and data frames may be transmitted across the AP in State 5 including those pertaining to EAP over LAN (EAPOL) and DHCP. Transmission of these frames permits FILS EAP authentication and FILS DHCP early deployment.

As shown in FIG. 3, in an embodiment State 4 cannot be achieved until a successful FILS association 306 is achieved. Once the FILS association 306 is completed, the client is transitioned to State 4. At State 4, the client is permitted to communicate on the WLAN or through to the wired network. In other words, the client is free to pass Class 1, 2 and 3 frames or packets through the AP.

Use of the state machine 300 in FIG. 3 provides several advantages. For example, authentication in State 5 takes place prior to State 3 as with the standard state machines 100, 200 of FIGS. 1-2. In addition, the state machine 300 of FIG. 3 is able to satisfy the performance requirements of the IEEE 802.11ai task group (i.e., IEEE 802.11 TGai) and reduce the complication of software/hardware modifications needed to satisfy the IEEE 802.11ai specification. Moreover, the state machine 300 operates without violating the existing RSNA security architecture employing the EAP/802.1x framework while allowing specified EAP messages to traverse at State 2 instead of being block as specified in RSNA.

Figure 4:
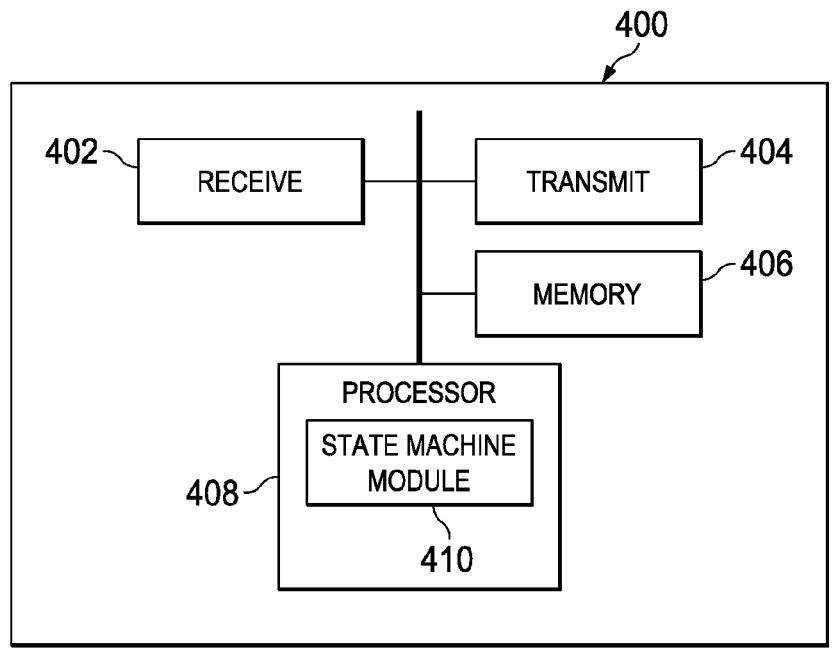
FIG. 4 is an embodiment of a simplified communications device (e.g., an access point) adapted to utilize the state machine of FIG. 3.

Referring now to FIG. 4, a simplified schematic of a communications device 400 (e.g., an AP) configured to employ the state machine 300 of FIG. 3 is illustrated. The communications device 400 generally includes a receive unit 402 used to receive incoming information, which is generally in the form of IP packets. Communications device 400 also includes a transmit unit 404 used to transmit outgoing information. In general, frames or packets may arrive at communications device 400 through receive unit 402 and may leave through transmit unit 404.

Communications device 400 also includes a memory 406 used to store configuration information, routing information, and so forth. Memory 406 may be a combination of read-only memory, random access memory, programmable read-only memory, and so on.

In an embodiment, the receive unit 402, transmit unit 404, and memory 406 are operatively coupled to a control unit 408. Control unit 408 may be implemented using a general purpose or special purpose processor or controller, combinatorial logic, state machines, or a combination thereof. The control unit 408 is generally used to control the operation of communications device 400. In an embodiment, the control unit 408 includes a state machine module 410 to process information pertinent to use of the state machine 300. By way of example, in an embodiment the state machine module 410 permits class one, class two, and selected management and data frames to be transmitted if the FILS authentication procedure is successful and permits all frames to be transmitted if the FILS association is successful.

Figure 5:
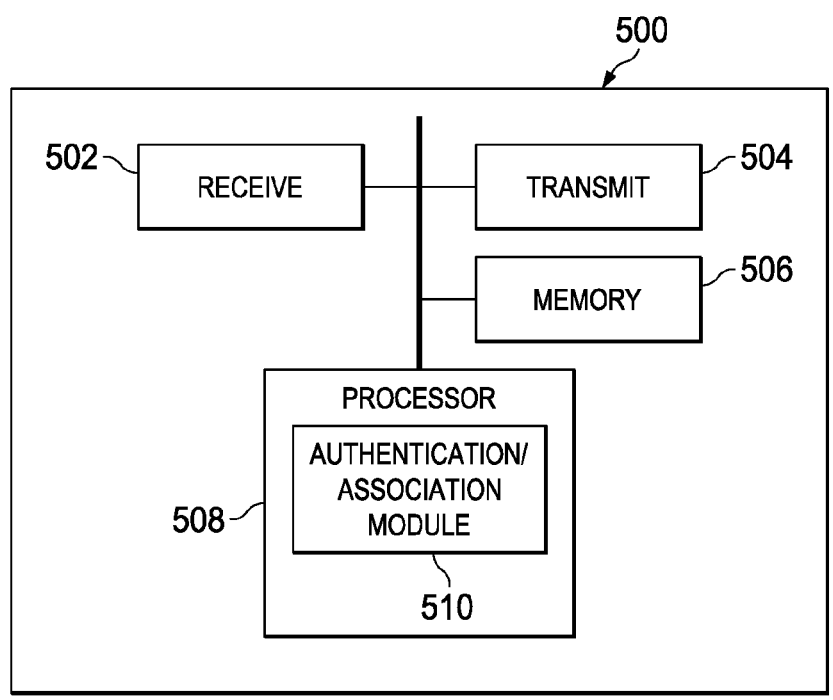
FIG. 5 is an embodiment of a simplified communications device (e.g., a client or station) adapted to utilize the state machine of FIG. 3.

Referring now to FIG. 5, a simplified schematic of a communications device 500 (e.g., a station, client, etc.) configured to employ the state machine 300 of FIG. 3 is illustrated. The communications device 500 generally includes a receive unit 502 used to receive incoming information, which is generally in the form of IP packets. Communications device 500 also includes a transmit unit 504 used to transmit outgoing information. In general, frames or packets may arrive at communications device 500 through receive unit 502 and may leave through transmit unit 504.

Communications device 500 also includes a memory 506 used to store configuration information, routing information, and so forth. Memory 506 may be a combination of read-only memory, random access memory, programmable read-only memory, and so on.

In an embodiment, the receive unit 502, transmit unit 504, and memory 506 are operatively coupled to a control unit 508. Control unit 508 may be implemented using a general purpose or special purpose processor or controller, combinatorial logic, state machines, or a combination thereof. The control unit 508 is generally used to control the operation of communications device 500. In an embodiment, the control unit 508 includes an authentication/association module 510 to process information pertinent to use of the state machine 300. By way of example, in an embodiment the authentication/association module 510 receives authorization to transmit class one, class two, and selected management and data frames if the FILS authentication procedure is successful and receives authorization to transmit all frames if the FILS association is successful.

Figure 6:
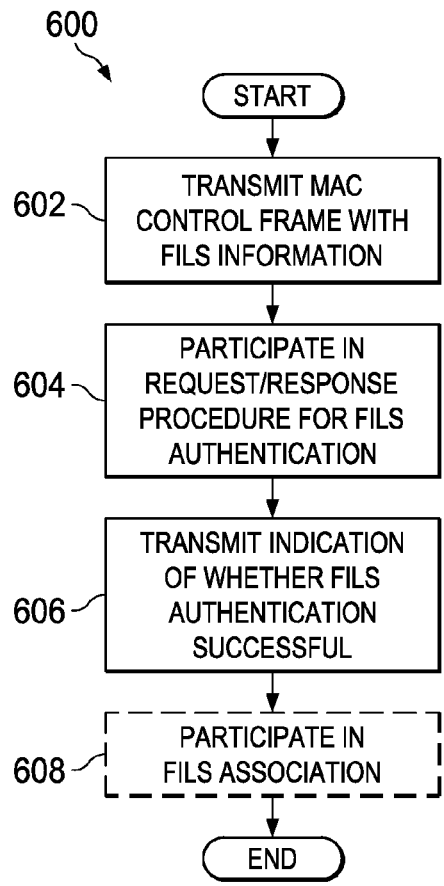
FIG. 6 is an embodiment of a method of transmitting data with the revised 802.11 state security machine of FIG. 3.

Referring now to FIG. 6, a method 600 of transmitting data is illustrated. In block 602, the AP announces its presence and ability to engage in FILS authentication using state machine 300 of FIG. 3 by transmitting a medium access control frame with FILS information. In block 604, the AP transmits a probe response with FILS information to a client in response to a probe request from that client. In other words, the AP participates with the client in a request/response procedure for FILS authentication. In block 606, the AP sends a message to client with an indication of whether the FILS authentication was successful.

If the FILS authentication was not successful, the client is restricted to State 1 as shown in FIG. 3 and FILS authentication is not achieved. If, however, FILS authentication is successful, the AP permits the client to transition to State 5 of FIG. 3 where certain limited frames can be transmitted through the AP. Thereafter, in block 608 the AP participates with the client in a FILS association procedure. If the FILS association was not successful, the AP restricts the client to State 5 as shown in FIG. 3 and full authentication and association is not achieved. If, however, the FILS association was successful, the AP transitions the client to State 4 of FIG. 3 where the client is permitted to pass all frames (e.g., Class 1, 2 and 3) through the AP.

Figure 7:
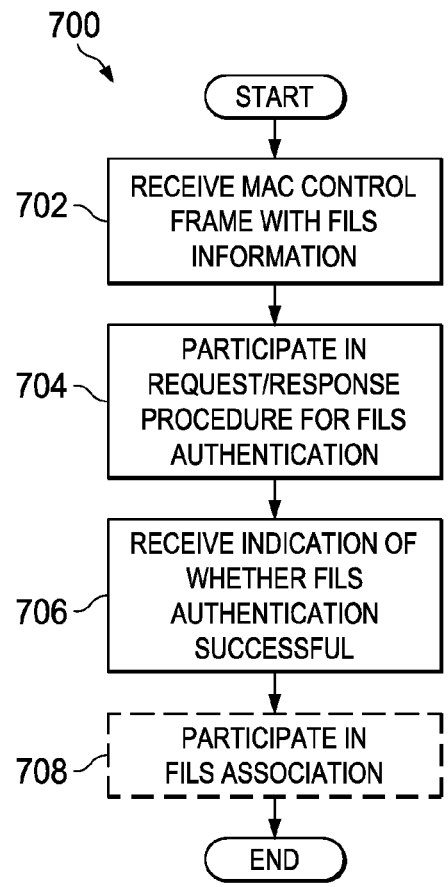
FIG. 7 is another embodiment of a method of transmitting data with the revised 802.11 state security machine of FIG. 3.

Referring now to FIG. 7, a method 700 of transmitting data is illustrated. In block 702, the client discovers or receives the medium access control frame with FILS information being transmitted by the AP. In block 704, the client participates with the AP in a request/response procedure for FILS authentication. In block 706, the client receives a message from the AP with an indication of whether the FILS authentication was successful.

If the FILS authentication was not successful, the client is restricted to State 1 as shown in FIG. 3 and FILS authentication is not achieved. If, however, FILS authentication is successful, the client is transitioned by the AP to State 5 of FIG. 3 where certain limited frames can be transmitted through the AP. Thereafter, in block 708 the client participates with the AP in a FILS association procedure. If the FILS association was not successful, the client is restricted to State 5 as shown in FIG. 3 and full authentication and association is not achieved. If, however, the FILS association was successful, the client is transitioned to State 4 of FIG. 3 where the client is permitted to pass all frames (e.g., Class 1, 2 and 3) through the AP.

Although embodiments described hereinabove operate within the specifications of a cellular communication network such as a 3GPP-LTE cellular network, other wireless communication arrangements are contemplated within the broad scope of an embodiment, including WiMAX, GSM, Wi-Fi, and other wireless communication systems.

It is noted that, unless indicated otherwise, functions described herein can be performed in either hardware or software, or some combination thereof, with or without human intervention. In an embodiment, the functions are performed by a processor such as a computer or an electronic data processor in accordance with code such as computer program code, software, and/or integrated circuits that are coded to perform such functions, unless indicated otherwise.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for transmitting data, comprising:
transmitting a medium access control (MAC) frame for fast initial link set up (FILS) authentication;
participating in a FILS authentication procedure with a client;
transmitting a response to the client indicating FILS authentication is successful;
transitioning to a FILS authenticated and unassociated state in accordance with the successful FILS authentication;
maintaining FILS security association key materials in the FILS authenticated and unassociated state;
receiving, from the client, MAC service data units (MSDUs) carrying control frames and/or management frames, after the FILS authentication is successful and before a FILS association is completed with the client;
participating, after the successful FILS authentication, in the FILS association with the client to associate the client; and
permitting data frames to be transmitted after the FILS association is successful.

2. The method of claim 1, wherein participating in the FILS authentication procedure with the client includes transmitting a probe response with FILS information to the client.

3. The method of claim 2, wherein the FILS information comprises another MAC frame.

4. The method of claim 1, further comprising permitting selected data frames to be transmitted in accordance with the successful FILS authentication.

5. The method of claim 1, wherein the control frames comprise one or more of clear to send (CTS), acknowledgement (ACK), CF-End, CF-END+CF-Act), the management frames comprising one or more of probe response, beacon, authentication, deauthentication, and announcement traffic indication message (ATM).

6. The method of claim 1, wherein the management frames comprising association request/response, reassociation request/response, and disassociation.

7. The method of claim 1, wherein participating in the FILS association with the client causes transition from a FILS authenticated and unassociated State 5 to an authenticated and associated State 4 after the FILS association is successful.

8. The method of claim 1, further comprising operating a state machine in parallel with the transmitting the MAC frame, the participating in the FILS authentication procedure, and the transmitting the response.

9. A method for transmitting data, comprising:
- receiving a medium access control (MAC) frame with fast initial link set up (FILS) information;
- participating in a FILS authentication procedure with an access point (AP);
- receiving a response from the AP indicating FILS authentication is successful;
- transitioning to a FILS authenticated and unassociated state in accordance with the successful FILS authentication;
- maintaining FILS security association key materials in the FILS authenticated and unassociated state;
- transmitting, to the AP, MAC service data units (MSDUs) carrying control frames and/or management frames, after the FILS authentication is successful and before a FILS association is completed with the AP;
- participating, after the successful FILS authentication, in the FILS association with the AP to associate a client; and
- receiving authorization to transmit data frames after the FILS association is successful.

10. The method of claim 9, wherein participating in the FILS authentication procedure with the AP includes transmitting a probe request with FILS information to the AP.

11. The method of claim 9, further comprising transmitting data frames in accordance with the successful FILS authentication.

12. The method of claim 9, further comprising transitioning from a FILS authenticated and unassociated State 5 to an authenticated and associated State 4 after the FILS association is successful.

13. The method of claim 9, further comprising operating a state machine in parallel with the receiving the MAC frame, the participating in the FILS authentication procedure, and the receiving the response.

14. A communications device, comprising:
- a receiver configured to receive packets;
- a transmitter configured to transmit packets; and
- a state machine module coupled to the receiver and to the transmitter, the state machine module configured to:
  - participate in a fast initial link set up (FILS) authentication procedure with a client to authenticate the client;
  - transition to a FILS authenticated and unassociated state in accordance with successful FILS authentication of the client;
  - maintain FILS security association key materials in the FILS authenticated and unassociated state;
  - receive, from the client, medium access control (MAC) service data units (MSDUs) carrying control frames and/or management frames, after the FILS authentication procedure is successful and before a FILS association procedure is completed with the client;
  - participate, after the successful FILS authentication procedure, in the FILS association procedure with the client to associate the client; and
  - permit data frames to be transmitted after the FILS association procedure is successful.

15. The communications device of claim 14, wherein the state machine module is configured to transition the communications device to an authenticated and associated state after the FILS association procedure is successful.

16. The communications device of claim 14, wherein the state machine module is configured to operate a state machine.

17. A communications device, comprising:
- a receiver configured to receive packets;
- a transmitter configured to transmit packets; and
- an authentication/association module coupled to the receiver and to the transmitter, the authentication/association module configured to:
  - participate in a fast initial link set up (FILS) authentication procedure and a FILS association procedure with an access point (AP) to obtain authentication and association from the AP;
  - transition the communications device to a FILS authenticated and unassociated state after the FILS authentication procedure is successful;
  - maintain FILS security association key materials in the FILS authenticated and unassociated state;
  - transmit, to the AP, medium access control (MAC) service data units (MSDUs) carrying control frames and/or management frames, after the FILS authentication procedure is successful and before the FILS association procedure is completed with the AP;
  - participate, after the successful FILS authentication procedure, in the FILS association procedure with the AP to associate a client;
  - transition the communications device to an authenticated and associated state after the FILS association procedure is successful; and
  - receive authorization to transmit data frames after the FILS association procedure is successful.

18. The communications device of claim 17, wherein the authentication/association module is configured to operate a state machine.

19. The method of claim 1, further comprising permitting data to be transmitted, after the FILS authentication is successful and before the FILS association is completed with the client.

* * * * *